United States Patent Office 3,847,944
Patented Nov. 12, 1974

3,847,944
PROPENYLCYCLOPROPANECARBOXYLATES
Nobuo Ohno and Nobushige Itaya, Ikeda, Toshio Mizutani and Shigeyoshi Kitamura, Toyonaka, Takashi Matsuo, Amagasaki, and Yositosi Okuno, Toyonaka, Japan, assignors to Sumitomo Chemical Company, Limited, Osaka, Japan
No Drawing. Filed Dec. 27, 1971, Ser. No. 212,637
Claims priority, application Japan, Dec. 25, 1970, 45/129,006; May 12, 1971, 46/32,027; July 5, 1971, 46/49,739
Int. Cl. C07d 5/16
U.S. Cl. 260—332.2 R                 7 Claims

ABSTRACT OF THE DISCLOSURE

Propenylcyclopropanecarboxylate represented by the formula (I),

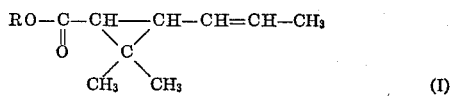

(I)

wherein propenyl group on the cyclopropane ring is cis or trans configuration regarding to the double bond, and R is

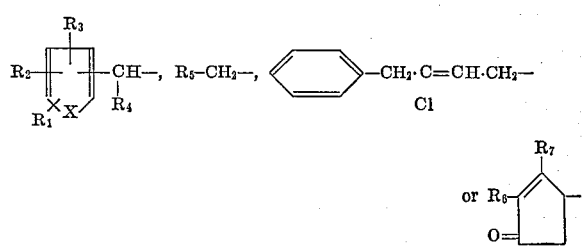

wherein $R_1$ is a $C_1$–$C_3$ alkyl, allyl, propargyl, benzyl, thenyl, furylmethyl, phenoxy or lower alkyl substituted benzyl, thenyl, furylmethyl or phenoxy, $R_2$ and $R_3$ are hydrogen or methyl respectively, or $R_1$ and $R_2$ are bonded at respective ends of the adjacent two groups to form a $C_3$–$C_4$ polymethylene group, $R_4$ is hydrogen, lower alkyl, lower alkenyl or lower alkinyl, X is oxygen or sulfur, or —CH=CH—, $R_5$ is phthalimido, thiophthalimido, di- or tetrahydrophthalimido, or a substituted maleimido (the substituent being one or two $C_1$–$C_3$ alkyls or phenyls, $R_6$ is lower alkenyl, lower alkinyl, furfuryl or benzyl and $R_7$ is hydrogen or methyl respectively.

This invention relates to novel propenylcyclopropanecarboxylate represented by the formula (I),

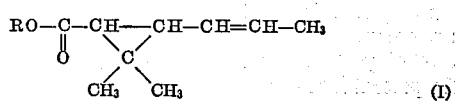

(I)

wherein propenyl group on the cyclopropane ring in cis or trans configuration regarding to the double bond, and R is

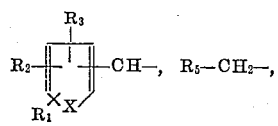

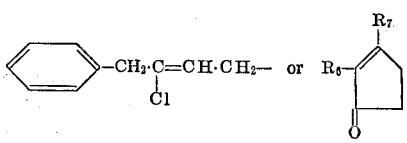

wherein $R_1$ is a $C_1$–$C_3$ alkyl, allyl, propargyl, benzyl, thenyl, furylmethyl, phenoxy or lower alkyl substituted benzyl, thenyl, furylmethyl or phenoxy, $R_2$ and $R_3$ are hydrogen or methyl respectively, or $R_1$ and $R_2$ are bonded at respective ends of the adjacent two groups to form a $C_3$–$C_4$ polymethylene group, $R_4$ is hydrogen lower alkyl, lower alkenyl or lower alkinyl, X is oxygen or sulfur or —CH=CH—, $R_5$ is phthalimido, thiophthalimido, di- or tetrahydrophthalimido, or a substituted maleimido (the substituent being one or two $C_1$–$C_3$ alkyls or phenyls), $R_6$ is lower alkenyl, lower alkinyl, furfuryl or benzyl and $R_7$ is hydrogen or methyl respectively; a process for preparing the same; and insecticidal compositions containing the same as active ingredients.

Various insecticides of the cyclopropanecarboxylic acid ester type have heretofore been known, and there are several esters also in pyrethrum components.

Among many insecticides available at present, the pyrethrum extracts have widely been used for the control of sanitary injurious insects and agricultural and horticultural injurious insects, because of their excellent insecticidal effect, low toxicity to mammals and quick acting on injurious insects and because they hardly impart vital resistance to injurious insects. However, they are expensive and are not particularly excellent in persistency of insecticidal effect. Accordingly, a large number of homologous compounds have been synthesized by many researchers. However, the synthesized products, which are commercially available at present, have their merits and demerits and, when used singly, they just satisfy some of the requirements for insecticides.

An object of the present invention is to provide novel propenylcyclopropanecarboxylates free from the above-mentioned drawbacks.

Another object of the invention is to provide a process for preparing the same.

A further object of the invention is to provide insecticidal compositions containing the same as active ingredients which are more excellent in insecticidal effects than those of the conventional insecticides.

The esters represented by the formula (I) are novel compounds, and can be obtained by reacting a compound of the formula (V), (VI), (VII) or (VIII),

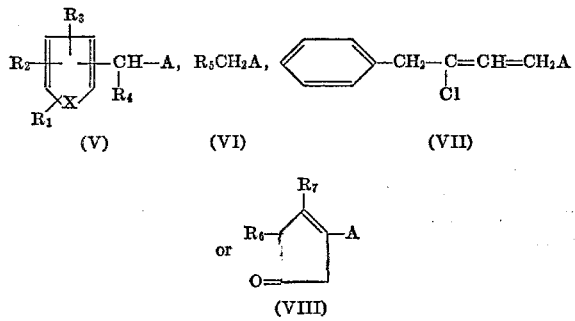

(V)    (VI)    (VII)

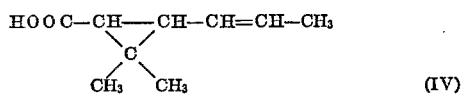

(VIII)

wherein $R_1$, $R_2$, $R_3$, $R_4$, $R_5$, $R_6$, $R_7$ and X are as defined above and A is hydroxyl or a halogen, with a cyclopropanecarboxylic acid of the formula (IV) or a reactive derivative thereof, $$HOOC-CH\underset{\underset{CH_3}{}}{\overset{\overset{}{}}{\underset{C}{\diagdown \diagup}}}CH-CH=CH-CH_3$$

$$CH_3 \quad CH_3 \qquad (IV)$$

if necessary in the presence of a suitable reaction adjuvant. The reactive derivative referred to herein indicates an acid halide, an acid anhydride, an ester or a salt of an alkali metal or an organic base.

Procedures for synthesis of the present esters are explained in detail below.

(1) In case a carboxylic acid of the formula (IV) is used, the reaction is accomplished under dehydration conditions. That is, the acid is reacted at or above room temperature with an alcohol of the formula (V), (VI), (VII), or (VIII), in a suitable inert solvent in the presence of such a dehydrating agent as dicyclohexyl carbodiimide, whereby a desired ester can be obtained in a high yield.

(2) In case an acid halide is used as the reactive derivative of the carboxylic acid of the formula (IV), the object can be sufficiently accomplished by reacting the acid halide at room temperature with the aforesaid alcohol, using as a dehydrogen-halide agent an organic tertiary base such as pyridine or triethylamine. The acid halide used in this case may be any of those within the scope of the invention, but is ordinarily an acid chloride. In the reaction, the presence of a solvent is preferable for smooth reaction. As the solvent, there is ordinarily used such an inert solvent as benzene, toluene or petroleum benzine.

(3) In case an acid anhydride is used as the reactive derivative of the carboxylic acid of the formula (IV), the object can be accomplished by reacting the anhydride with the aforesaid alcohol, without any auxiliary agent. In this case, the elevation of temperature is preferable for acceleration of the reaction, and the use of an inert solvent such as toluene or xylene is preferable for smooth reaction.

(4) In case an ester of lower alkyl alcohol e.g. a methyl ester, is used as the reactive derivative of the carboxylic acid of the formula (IV), the ester is reacted at an elevated temperature with the alcohol of the formula (V), (VI), (VII), or (VIII), in an inert solvent such as toluene in the presence of a suitable organic base catalyst, preferably a metal alkoxide corresponding to the lower alkyl alcohol, e.g. sodium methylate, thereby effecting an ester exchange reaction, while removing the formed low boiling alcohol by a rectifier, whereby a desired ester can be obtained.

(5) In case a salt of an alkali metal or an organic tertiary base is used as the reactive derivative of the carboxylic acid of the formula (IV), the salt is reacted with the halide of the formula (V), (VI), (VII) or (VIII) in the presence of an inert solvent such as benzene, dimethylformamide and acetone. The reaction may be preferably conducted under heating to or below boiling point of the solvent in order to accelerate the reaction. In this reaction it is not always necessary to form the salt of the carboxylic acid, and the alkali metal or the organic tertiary base may be added simultaneously together with the carboxylic acid of the formula (IV) to the halide. The chloride (A in the formula (V) or (VI) being chlorine) is usually employed and it is needless to say that the other halide, such as bromide may also be employed.

The methyl ester of the cyclopropanecarboxylic acid in which methyl group of the propenyl group in the formula (IV) being cis-methyl, is known compound already synthesized by L. Crombie et al. (J.C.S., 1970, 1076). The cyclopropanecarboxylic acid in which methyl group of the propenyl group in the formula (IV) is trans-methyl, is a novel compound and may be prepared by reacting $\beta,\beta$-dimethyl acrylic ester with phenyl crotyl sulfone The carboxylic acids of the formula (IV) involve optical and geometrical isomers derived from asymmetric carbon atoms and steric structures.

Further, the reactive derivatives of these carboxylic acids can be easily obtained according to ordinary procedures from the carboxylic acids. That is, the acid halides are obtained by the reaction of the carboxylic acids with thionyl halides or phosphorus halides, and the acid anhydrides by refluxing the carboxylic acids together with acetic anhydride.

Examples of the compound of the formulae (V), (VI), (VII) and (VIII) are as follows:

5-Benzyl-3-furylmethyl alcohol
5-(2'-Thenyl)-3-furylmethyl alcohol
5-Benzyl-2-thenyl alcohol
3-Benzylbenzyl alcohol
5-Propargylfurfuryl alcohol
5-Propargyl-2-thenyl alcohol
4-Propargylbenzyl alcohol
5-Allylfurfuryl alcohol
4-Allylbenzyl alcohol
4,5-Tetramethylenefurfuryl alcohol
4,5-Tetramethylene-2-thenyl alcohol
4,5-Trimethylene-2-thenyl alcohol
5-Phenoxyfurfuryl alcohol
5-Phenoxy-3-furylmethyl alcohol
5-Phenoxy-2-thenyl alcohol
3-Phenoxybenzyl alcohol
2-Propargyl-3-methyl-4-hydroxy-2-cyclopentene-1-one
2-Methyl-5-propargyl-3-furylmethyl alcohol
N-Hydroxymethyl-3,4,5,6-tetrahydrophthalimide
N-Hydroxymethyl-dimethylmaleimide
N-Hydroxymethyl-phenylmethylmaleimide
N-Hydroxymethyl-3,6-dihydrophthalimide
N-Hydroxymethyl-thiophthalimide
5-Propargyl-$\alpha$-ethynylfurfuryl alcohol
5-Propargyl-$\alpha$-propargylfurfuryl alcohol
4-Phenyl-3-chloro-trans-2-butene-1-yl alcohol
2-Allyl-3-methyl-2-cyclopentene-1-one-4-yl alcohol
2-Allyl-2-cyclopentene-1-one-4-yl alcohol
2-Propargyl-3-methyl-2-cyclopentene-1-one-4-yl alcohol
2-Furfuryl-3-methyl-2-cyclopentene-1-one-4-yl alcohol
2-Benzyl-3-methyl-2-cyclopentene-1-4-yl alcohol Typical examples of the propenylclopropanecarboxylate represented by the formula (I), which are obtained according to such procedures as mentioned above, are as set forth below, but the compounds of the present invention are, of course, not limited to these examples.

Among the esters represented by the formula (I), there are stereoisomers derived from the steric structures of the carboxylic acids and optical isomers derived from the asymmetric carbon atoms of the carboxylic acids and the alcohol portions, and these isomers are also involved in the present invention.

| Compound number | Structural formula |
|---|---|
| (1) | 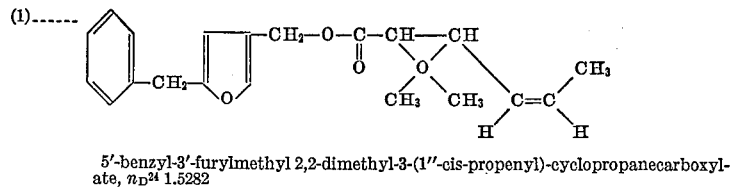<br>5'-benzyl-3'-furylmethyl 2,2-dimethyl-3-(1''-cis-propenyl)-cyclopropanecarboxylate, $n_D^{24}$ 1.5282 |
| (2) | 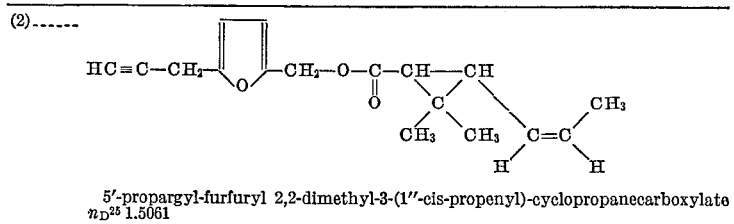<br>5'-propargyl-furfuryl 2,2-dimethyl-3-(1''-cis-propenyl)-cyclopropanecarboxylate $n_D^{25}$ 1.5061 |
| (3) | 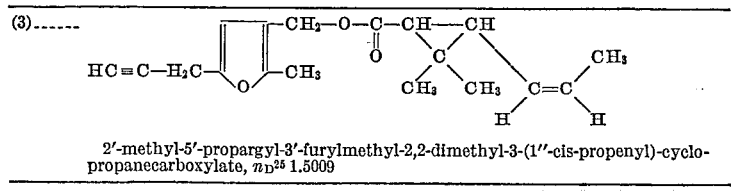<br>2'-methyl-5'-propargyl-3'-furylmethyl-2,2-dimethyl-3-(1''-cis-propenyl)-cyclopropanecarboxylate, $n_D^{25}$ 1.5009 |
| (4) | 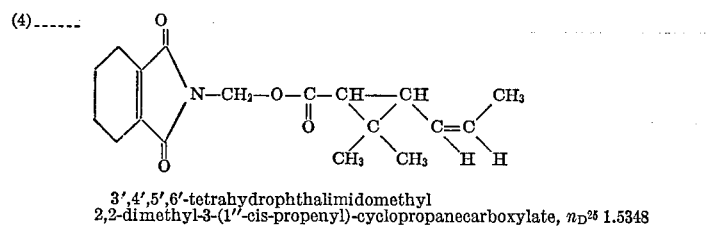<br>3',4',5',6'-tetrahydrophthalimidomethyl 2,2-dimethyl-3-(1''-cis-propenyl)-cyclopropanecarboxylate, $n_D^{25}$ 1.5348 |
| (5) | 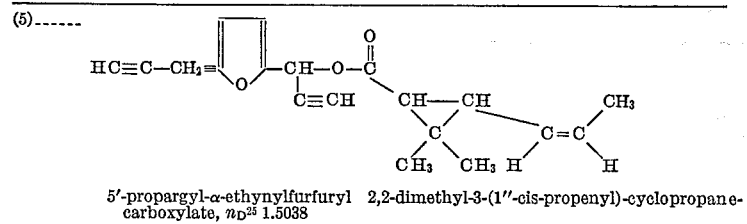<br>5'-propargyl-α-ethynylfurfuryl 2,2-dimethyl-3-(1''-cis-propenyl)-cyclopropanecarboxylate, $n_D^{25}$ 1.5038 |
| (6) | 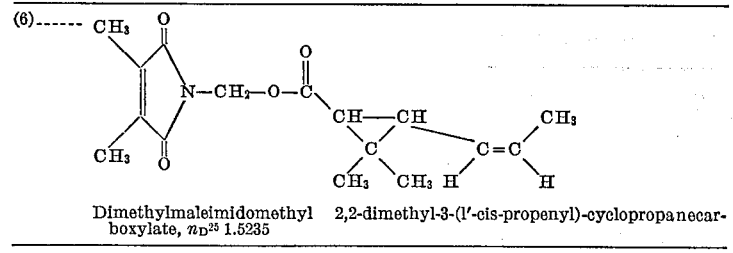<br>Dimethylmaleimidomethyl 2,2-dimethyl-3-(1'-cis-propenyl)-cyclopropanecarboxylate, $n_D^{25}$ 1.5235 |
| (7) | 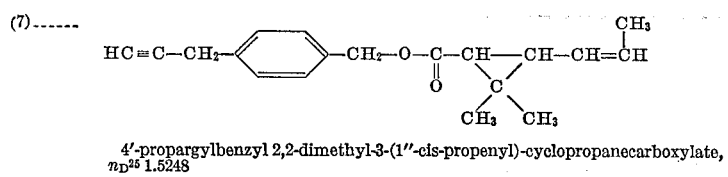<br>4'-propargylbenzyl 2,2-dimethyl-3-(1''-cis-propenyl)-cyclopropanecarboxylate, $n_D^{25}$ 1.5248 |
| (8) | 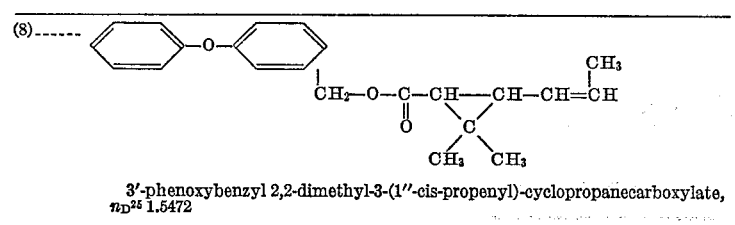<br>3'-phenoxybenzyl 2,2-dimethyl-3-(1''-cis-propenyl)-cyclopropanecarboxylate, $n_D^{25}$ 1.5472 |

TABLE—Continued

| Compound number | Structural formula |
|---|---|
| (9) | 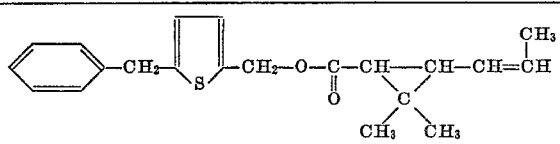
5'-benzyl-2'-thenyl 2,2-dimethyl-3-(1''-cis-propenyl)-cyclopropanecarboxylate, $n_D^{25}$ 1.5505 |
| (10) | 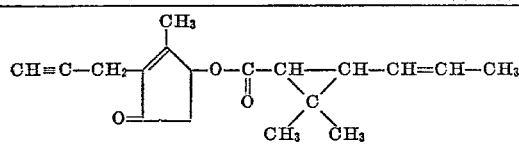
2'-propargyl-3'-methyl-2'-cyclopentene-1'-one-4'-yl 2,2-dimethyl-3-(1''-cis-propenyl)-cyclopropanecarboxylate, $n_D^{25}$ 1.5097 |
| (11) | 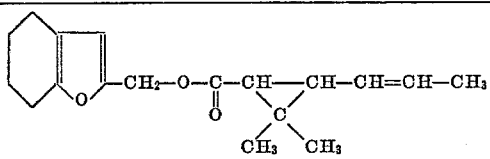
4',5'-tetramethylenefurfuryl 2,2-dimethyl-3-(1''-cis-propenyl)-cyclopropanecarboxylate, $n_D^{25}$ 1.5172 |
| (12) | 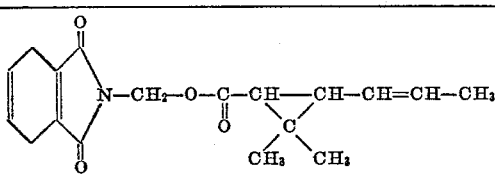
3',6'-dihydrophthalimidomethyl 2,2-dimethyl-3-(1''-cis-propenyl)-cyclopropanecarboxylate |
| (13) | 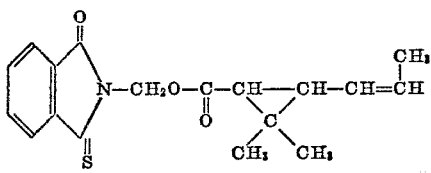
Monothiophthalimidomethyl 2,2-dimethyl-3-(1'-cis-propenyl)-cyclopropanecarboxylate |
| (14) | 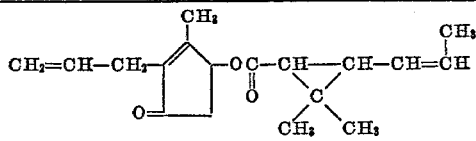
2-allyl-3-methyl-2-cyclopentene-1-one-4-yl (1'-cis-propenyl)-cyclopropanecarboxylate, $n_D^{22.6}$ 1.5058 |
| (15) | 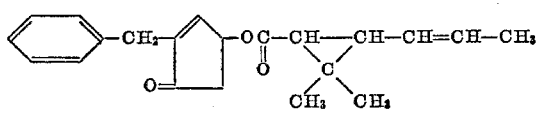
2-benzyl-2-cyclopentene-1-one-4-yl (1'-cis-propenyl)-cyclopropanecarboxylate, $n_D^{25.5}$ 1.5311 |
| (16) | 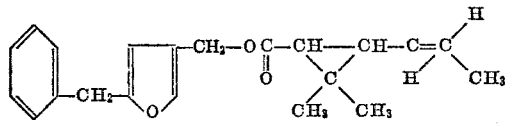
5'-benzyl-3'-furylmethyl 2,2-dimethyl-3-(1''-trans-propenyl)-cyclopropanecarboxylate, $n_D^{25.5}$ 1.5300 |

TABLE—Continued

| Compound number | Structural formula |
|---|---|
| (17) | 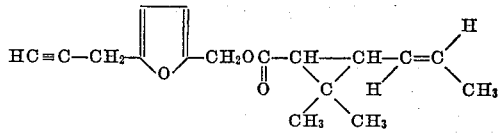<br>5'-propargyl-furfuryl 2,2-dimethyl-3-(1''-trans-propenyl)-cyclopropanecarboxylate, $n_D^{25}$ 1.4985 |
| (18) | 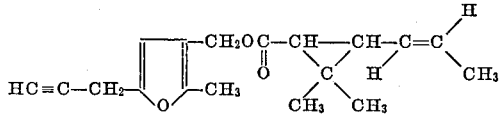<br>2'-methyl-5'-propargyl-3'-furylmethyl 2,2-dimethyl-3-(1''-trans-propenyl)-cyclopropanecarboxylate, $n_D^{22}$ 1.5046. |
| (19) | 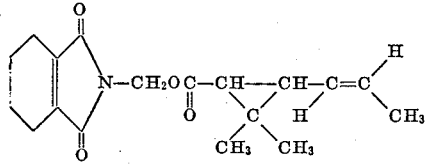<br>3',4',5',6'-tetrahydrophthalimidomethyl 2,2-dimethyl-3-(1''-trans-propenyl) cyclopropanecarboxylate, $n_D^{21.5}$ 1.5179 |
| (20) | 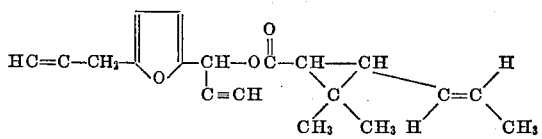<br>5'-propargyl-α-ethynylfurfuryl 2,2-dimethyl-3-(1''-trans-propenyl)-cyclopropanecarboxylate, $n_D^{25}$ 1.5066 |
| (21) | 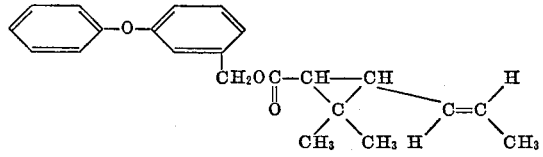<br>3'-phenoxybenzyl 2,2-dimethyl-3-(1''-trans-propenyl)-cyclopropanecarboxylate $n_D^{21}$ 1.5507 |
| (22) | 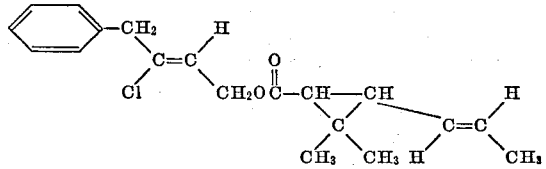<br>4'-phenyl-3'-chloro-2'-trans-butene-1'-yl 2,2-dimethyl-3-(1''-trans-propenyl)-cyclopropanecarboxylate, $n_D^{29.5}$ 1.5233 |

Procedures for synthesis of the present compounds are illustrated in further detail below with reference to examples.

Example 1

Synthesis of 5'-benzyl-3'-furylmethyl 2,2-dimethyl - 3- (1'-cis-propenyl)-cyclopropanecarboxylate: To a 50 ml. reaction flask was fed a solution of 500 mg. (2.97 mmol.; millimols) of methyl-2,2-dimethyl-3-(1' - cis - propenyl)- cyclopropanecarboxylate and 559 mg. (2.97 mmol.) of 5-benzyl-3-furylmethyl alcohol in 30 ml. of toluene. After adding to the solution 50 mg. of sodium methylate as a catalyst, a 50 cm. platinum spinning band rectifier was attached to the flask, and the solution was heated with stirring at 100° to 115° C. for about 1 hour to remove the formed methyl alcohol. After cooling, the reaction liquid was poured into 20 ml. of cold water and then separated. The water layer was extracted 2 times with 15 ml. of ether. The organic layers were united together, washed with a saturated aqueous sodium chloride solution and then dried over anhydrous sodium sulfate. Subsequently, the solvent was removed by distillation under reduced pressure, whereby 860 mg. of a crude ester was obtained. The crude ester was purified through a column packed with 20 g. of silica gel to obtain 740 mg. of a desired ester as a colorless oil $n_D^{24}$ 1.5282.

Elementary analysis.—Calc'd for $C_{21}H_{24}O_3$ (percent): C, 77.75; H, 7.46. Found (percent): C, 77.79; H, 7.39.

Example 2

Synthesis of 5'-propargylfurfuryl 2,2-dimethyl-3 - (1''-cis-propenyl) - cyclopropanecarboxylate: A solution of 476 mg. (3.5 mmol.) of 5-propargylfurfuryl alcohol and 332 mg. (4.2 mmol.) of pyridine in 15 ml. of dry benzene was maintained at below 10° C. with ice-cooling. Into this solution was dropped a solution of 604 mg. (3.5 mmol.) of 2,2-dimethyl-3-(1' - cis - propenyl)-cyclopropanecarboxylic acid chloride in 5 ml. of dry benzene.

After completion of the dropping, the ice bath was removed, and the mixed solution was reacted at room temperature for 3 hours. The reaction liquid was poured into 10 ml. of cold water to dissolve a deposited pyridine hydrochloride, and then separated. The water layer was extracted 2 times with 5 ml. of ether. The organic layers were united together, washed successively with a 5% aqueous hydrochloric acid solution, a saturated aqueous sodium hydrogen carbonate solution and a saturated sodium chloride solution, and then dried over anhydrous sodium sulfate. Subsequently, the solvent was removed by distillation under reduced pressure, whereby 810 mg. of a crude ester was obtained as a yellow oil. The crude ester was distilled under high vacuum to obtain 750 mg. of the desired ester as a pale yellow oil, b.p. 135–140° C./0.07 mm. Hg.

Elementary analysis.—Calc'd for $C_{17}H_{20}O_3$ (percent): C, 74.97; H, 7.40. Found (percent): C, 74.88; H, 7.46.

Example 3

Synthesis of 2-Allyl-3-methyl-2-cyclopentene-1-one - 4-yl 2',2'-dimethyl-3'-(1''-cis-propenyl) - cyclopropanecarboxylate: To a solution of 15.2 g. of 4-hydroxy-2-allyl-3-methyl-2-cyclopentene-1-one, in 50 ml. of dry benzene was dissolved 15.4 g. of 2,2-dimethyl-3-(1'-cis-propenyl)-cyclopropane carboxylic acid. To this solution was added with ice cooling a solution of 27 g. of dicyclohexylcarbodiimide in 20 ml. of dry benzene, and the mixed solution was allowed to stand overnight. Thereafter, the reaction mass was stirred for 2 hours at 50° C. and cooled, then the precipitate was removed by filtration. Filtrate was passed through a column packed with 70 g. of active alumina followed by elution of benzene. After the solvent was removed under vacuum, 24.5 g. of the ester was obtained as a pale yellow oil $n_D^{25}$ 1.5370.

Elementary analysis.—Cal'd for $C_{18}H_{24}O_3$ (percent): C, 74.97; H, 8.39. Found (percent): C, 75.51; H, 8.62.

Example 4

Synthesis of 4-hydroxy-2-benzyl-2-cyclopentene-1-one-4-yl 2',2'-dimethyl - 3' - (1'''-cis-propenyl)-cyclopropanecarboxylate: To a solution of 15.7 g. of 4-hydroxy-2-benzyl-2-cyclopentene-1-one in 50 ml. of dry toluene was added 8 g. of dry pyridine. To this solution was added under 20° C. 2,2-dimethyl-3-(1-cis-propenyl)-cyclopropanecarboxylic acid chloride in 20 ml. of dry toluene. Pyridine hydrochloride salt was then precipitated. After stirring at room temperature for 4 hours, the reaction mass was poured onto 60 ml. of 2% aqueous hydrogen chloride and then the separated oil layer was washed successively with a 2% aqueous sodium hydroxide solution and a saturated sodium chloride solution, and then dried over anhydrous magnesium sulfate. Thereafter, the toluene was removed by distillation, and the residue was purified through a column packed with active alumina followed by elution with benzene to obtain 13.2 g. of the ester as a pale yellow oil, $n_D^{25.5}$ 1.5311.

Elementary anlaysis.—Calc'd for $C_{21}H_{24}O_3$ (percent): C, 78.07; H, 7.74. Found (percent): C, 77.81; H, 7.52.

Example 5

Synthesis of 5'-propargyl-α-ethynylfurfuryl 2,2-dimethyl-3-(1''-trans - propenyl) - cyclopropanecarboxylate: 16 Grams of 5-propargyl-α-ethynylfurfuryl alcohol and 15.4 g. of 2,2-dimethyl - 3 - (1'-trans-propenyl)-cyclopropanecarboxylic acid were dissolved in 50 ml. of dry benzene and the mixture was cooled with ice cold water. A solution of 27 g. of dicyclohexylcarbodiimide in 20 ml. of dry benzene was dropped in 20 minutes, and the mixture was allowed to stand overnight at the room temperature. On the next day, the mixture was heated to 50° C. for 2 hours and cooled. The precipitate was filtered off and to a little colored filtrate were added 5.5 g. activated alumina and 2.7 g. silica gel. The mixture was stirred for 30 minutes and filtered. Solvent was evaporated to obtain 25.5 g. of the ester as a pale yellow oil $n_D^{25}$ 1.5066

Elementary analysis.—Calc'd for $C_{19}H_{20}O_3$ (percent): C, 77.00; H, 6.80. Found (percent): C, 77.41; H, 6.72.

Example 6

Synthesis of 3'-phenoxybenzyl 2,2 - dimethyl - 3 - (1''-trans-propenyl)-cyclopropanecarboxylate: 8.5 Grams of 2,2 - dimethyl-3-(1'-trans - propenyl) - cyclopropanecarboxylic acid and 6 g. of triethylamine were dissolved in 40 ml. of dry dimethylformamide and 10.9 g. of 3-phenoxybenzylchloride in 10 ml. of dry dimethylformamide was added at room temperature. Then the temperature was gradually raised to 70° C. and then white crystal precipitated. At that temperature was the mixture maintained for 2 hours. After cooling, the mixture was poured into ice water and extracted with toluene. Toluene extract was washed successively with a 2% aqueous sodium hydroxide solution and a saturated sodium chloride solution, and then toluene solution was purified through 50 g. of activated alumina packed in a column. Toluene was evaporated and 15.9 g. of the ester was obtained as a colorless oil, $n_D^{21}$ 1.5507.

Elementary analysis.—Calc'd for $C_{22}H_{24}O_3$ (percent): C, 78.54; H, 7.19. Found (percent): C, 78.91; H, 7.10.

Example 7

Synthesis of 4'-phenyl - 3' - chloro-2'-trans-butene-1'-yl 2,2 - dimetyhl-3-(1''-trans - propenyl) - cyclopropanecarboxylate: 8.5 Grams of 2,2-dimethyl-3-(1'-trans-propenyl)-cyclopropanecarboxylic acid and 6 g. of triethylamine were dissolved in 40 ml. of dry dimethylformamide and 16.8 g. of 4-phenyl-3-chloro-2-trans-butene-1-yltosylate in 20 ml. of dry dimethylformamide was added at room temperature. Then the mixture was treated according to the same way as in Example 6, and 14.8 g. of the desired ester was obtained as a colorless oil, $n_D^{29.5}$ 1.5233.

Elementary analysis.—Calc'd for $C_{19}H_{23}O_2Cl$ (percent): C, 71.57; H, 7.27; Cl, 11.12. Found (percent): C, 71.25; H, 6.91; Cl, 11.10.

The thus obtained esters of the present invention which are represented by the formula (I) are low toxic, have prominent insecticidal effects and display more excellent properties than those of esters of so-called chrysanthemic and pyrethric acids which are different in acid portion from the present esters. Particularly in knock down effect, the present esters are more excellent than corresponding chrysanthemic acid esters.

In order to make the above fact clearer, experimental examples, in which typical examples of the present esters were compared with corresponding chrysanthemic acid esters and pyrethric acid esters, and the results obtained in said experimental examples, are set forth below. A tendency of some biological activities as those of said typical examples was observed also in the case of other compounds of the formula (I) and isomers thereof. This tendency is the same with respect to geometrical isomers and optical isomers.

Experimental Example 1

The present compounds (1), (4), (7), (8), (9), (11), (16), (19), (21) and (22), chrysanthemic acid esters corresponding thereto, pyrethric acid esters corresponding to the present compounds (1) and (4), and allethrin were individually adjusted to test concentrations by use of deodorized kerosene. Subsequently, 0.7 ml. of each of the resulting oil sprays was uniformly sprayed under a pressure of 20 lbs./in.$^2$ by use of a glass atomizer into a (70 cm.)$^3$ glass chamber, in which had been liberated about 20 adults of Northern house mosquitoes, and then the number of knocked-down insects was counted with lapse of time. After 10 minutes, knocked-down insects were collected, fed and allowed to stand for 1 day, and the alive and dead thereof were observed. From the results of said counting and observation, $KT_{50}$ (50% knock down time) and mortality were calculated to obtain the values set forth in the following table:

| Test compound | | $KT_{50}$ (sec.) | Knock down mortality (percent) |
|---|---|---|---|
| Present compound: | | | |
| (1) | 0.1% oil spray. | 235 | 95 |
| (16) | do | 230 | 95 |
| Chrysanthemic acid ester corresponding to (1). | do | 236 | 95 |
| Pyrethric acid ester corresponding to (1) | do | 250 | 79 |
| Present compound: | | | |
| (4) | do | 84 | 79 |
| (19) | do | 89 | 78 |
| Chrysanthemic acid ester corresponding to (4). | do | 108 | 77 |
| Pyrethric acid ester corresponding to (4) | do | 92 | 45 |
| Present compound (7) | do | 263 | 88 |
| Chrysanthemic acid ester corresponding to (7). | do | 349 | 87 |
| Present compound: | | | |
| (8) | 0.5% oil spray. | 205 | 100 |
| (21) | do | 217 | 100 |
| Chrysanthemic acid ester corresponding to (8). | do | 292 | 100 |
| Present compound (9) | 0.2% oil spray. | 216 | 100 |
| Chrysanthemic acid ester corresponding to (9). | do | 275 | 100 |
| Present compound: | | | |
| (11) | do | 194 | 99 |
| (22) | 0.5% oil spray. | 230 | 100 |
| Chrysanthemic acid ester corresponding to— | | | |
| (11) | 0.2% oil spray. | 237 | 97 |
| (22) | 0.5% oil spray. | 271 | 100 |
| Allethrin | 0.2% oil spray. | 214 | 71 |

*Experimental Example 2*

The present compounds (1), (2), (3), (5), (6), (10), (16), (17), (18) and (20), chrysanthemic acid esters corresponding thereto, and allethrin were individually formulated into mosquito coils containing 0.6% of the respective compounds. Subsequently, 1 g. of each of the said mosquito coils was ignited on both ends and placed at the bottom of a (70 cm.)³ glass chamber, in which had been liberated about 20 adults of Northern house mosquitoes, and the number of knocked-down insects was counted for 24 minutes with lapse of time. Thereafter, knocked-down insects were collected, transferred to another chamber, fed and allowed to stand for 1 day, and then the alive and dead thereof were observed. From the results of said counting and observation, $KT_{50}$ and mortality were calculated to obtain the values as set forth in the following table:

As is clear from the above-mentioned experimental examples, the present compounds have excellent insecticidal and knock down effects on mosquitoes. Furthermore, they display prominent insecticidal activities on sanitary injurious insects such as houseflies, cockroaches, etc. and insects injurious to stored cereals, and are low toxic to mammals. Owing to such characteristics of the present compounds, insecticidal compositions containing the present compounds as active ingredients find wide uses for the prevention of epidemics and for the control of stored cereal-injurious insects. Further, the said compositions are broad in insecticidal activity, and hence are quite useful for the control of agricultural injurious insects such as green rice leafhoppers, brown planthoppers, larvae of Japanese giant silk moth, common cabbage worms, cabbage army worms, larvae of diamond back moth, common cut worms and the like, and forestry injurious insects. Particularly, the compositions are not only low toxic and harmless to mammals but also have repellent effects, so that they are freely applicable to crops before harvest, foods and packaging materials, and are usable for home horticulture and green house cultivation.

In preparing the compositions of the present invention, the present compounds may be formulated into any of oil sprays, emulsifiable concentrates, dusts, wettable powders, aerosols, granules, mosquito coils, and other heating or non-heating fumigants, according to procedures thoroughly known to those skilled in the art, using diluents for general insecticides, like in the case of the conventional pyrethroides. Alternatively, the present compounds may be formulated into death-inducing powder or solid preparations incorporated with baits or the like materials attractive for injurious insects.

The present compounds can display more prominent insecticidal activities when used in combination of two or more of the present compounds, and can be enhanced in insecticidal effect when used in admixture with such synergists for pyrethroides as α-[2-(2-butoxyethoxy)ethoxy]-4,5-methylenedioxy-2-propyl toluene (hereinafter referred to as "piperonyl butoxide"), 1,2-methylenedioxy-4-[2-(octylsulfinyl)propyl] benzene (hereinafter referred to as "sulfoxide"), 4-(3,4-methylenedioxyphenyl)-5-methyl-1,3-dioxane (hereinafter referred to as "sufroxane"), N - (2 - ethylhexyl)bicyclo[2,2,1]hepta-5-ene-2,3-dicarboximide (hereinafter referred to as "MGK–264") and octachlorodipropyl ether (hereinafter referred to as "S–421"), or other known synergists effective for allethrin and pyrethrin.

Further, the present compounds are incorporated with suitable amounts of, as stabilizers, phenol derivatives such as BHT, or arylamines such as phenyl-α-naphthylamine, phenyl-β-naphthylamine and phenetidineacetone condensates, whereby insecticidal compositions more stabilized in effect can be obtained.

| Test compound | | $KT_{50}$ (min. sec.) | Knock down mortality (percent) |
|---|---|---|---|
| Present compound: | | | |
| (1) | 0.6% mosquito coil. | 8'36" | 97 |
| (16) | do | 9'14" | 95 |
| Chrysanthemic acid ester corresponding to (1) | do | 12'12" | 92 |
| Present compound: | | | |
| (2) | do | 4'36" | 100 |
| (17) | do | 4'47" | 100 |
| Chrysanthemic acid ester corresponding to (2) | do | 5'18" | 100 |
| Present compound: | | | |
| (3) | do | 4'45" | 100 |
| (18) | do | 4'43" | 100 |
| Chrysanthemic acid ester corresponding to (3) | do | 5'42" | 100 |
| Present compound: | | | |
| (5) | do | 4'12" | 100 |
| (20) | do | 4'08" | 100 |
| Chrysanthemic acid ester corresponding to (5) | do | 5'12" | 100 |
| Present compound (6) | do | 7'12" | 86 |
| Chrysanthemic acid ester corresponding to (6) | do | 8'06" | 85 |
| Present compound (10) | do | 4'00" | 88 |
| Chrysanthemic acid ester corresponding to (10) | do | 5'24" | 90 |
| Allethrin | do | 8'42" | 81 |

Still further, the present compounds are used in admixture with other physiologically active substances, e.g. known cyclopropanecarboxylic acid ester type insecticides such as pyrethrin (pyrethrum extract), allethrin, N-(chrysanthemoxymethyl) - 3,4,5,6 - tetrahydrophthalimide (hereinafter referred to as "phthalthrin"), 5 - benzyl-3-furylmethyl chrysanthemate (hereinafter referred to as "Chrysron," registered trade mark of Sumitomo Chemical Co., Ltd.; the same shall apply hereinafter), 5-propargyl-furfuryl chrysanthemate and their geometrical and optical isomers, organo-chlorine type insecticides such as DDT, BHC and methoxychlor, organo-phosphorus type insecticides such as O,O-dimethyl-O-(3-methyl-4-nitrophenyl) phosphorothioate (hereinafter referred to as "Sumithion," registered trade mark of Sumitomo Chemical Co., Ltd., the same shall apply hereinafter) and O,O-dimethyl-O-(2,2-dichlorovinyl) phosphate (hereinafter referred to as "DDVP"), carbamate type insecticides such as 1-naphthyl-N-methylcarbamate, 3,4 - dimethylphenyl - N - methylcarbamate and 3,5 - dimethylphenyl - N - methylcarbamate, or other agricultural chemicals such as fungicides, nematocides, acaricides, herbicides, fertilizers, etc., whereby multi-purpose compositions excellent in effectiveness can be prepared, and synergistic effects due to mixing can be expected.

Procedures for preparation of the present compositions and effects thereof are illustrated below with reference to the following examples:

Example 8

0.2 Part of each of the present compounds (1), (2), (3), (4), (5), (6), (7), (8), (9), (10), (11), (12), (13), (14), (15), (16), (17), (18), (19), (20), (21) and (22) was dissolved in deodorized kerosene to make the total amount 100 parts, whereby oil sprays of the respective compounds were obtained.

Example 9

A mixture comprising 0.05 part of each of the present compounds (1), (2), (3), (4), (5), (6), (7), (8), (9), (10), (11), (16), (17), (18), (19), (20), (21) and (22) and 0.5 part of piperonyl butoxide was dissolved in deodorized kerosene to make the total amount 100 parts, whereby oil sprays of the respective compounds were obtained.

Example 10

A mixture comprising 0.1 part of each of the present compounds (2), (3), (4), (5) and (6) and 0.2 part of DDVP was dissolved in deodorized kerosene to make the total amount 100 parts, whereby oil sprays of the respective compounds were obtained.

Example 11

A mixture comprising 10 parts of each of the present compounds (1), (2), (3), (4), (5), (6), (7), (8), (9), (10) and (11), 30 parts of sufroxane and 10 parts of Sorpol SM-200 (registered trade mark of Toho Chemical Co.) was thoroughly stirred together with 50 parts of xylene to otbain emulsifiable concentrates of the respective compounds.

Example 12

A mixture comprising 0.4 part of the present compound (1), 7 parts of xylene and 7.6 parts of deodorized kerosene was packed in an aerosol container. After attaching a valve portion to the container, 85 parts of a propellant (liquefied petroleum gas) was introduced under pressure through said valve portion into the container to obtain an aerosol.

Example 13

A mixture comprising 0.4 part of each of the present compounds (5) and (14), 2.0 parts of piperonyl butoxide, 6.2 parts of xylene and 6.4 parts of deodorized kerosene was treated in the same manner as in Example 12 to obtain aerosols of the respective compounds.

Example 14

A mixture comprising 0.3 part of the present compound (4), 0.1 part of Chrysron, 1.2 parts of piperonyl butoxide, 6.4 parts of xylene and 7 parts of deodorized kerosene was treated in the same manner as in Example 12 to obtain an aerosol.

Example 15

A mixture comprising 0.2 part of the present compound (8), 0.2 part of phthalthrin, 2 parts of piperonyl butoxide, 6 parts of xylene and 6.6 parts of deodorized kerosene was treated in the same manner as in Example 12 to obtain an aerosol.

Example 16

A mixture comprising 0.3 part of the present compound (6), 0.5 part of Sumithion (registered trademark of Sumitomo Chemical Co., Ltd.), 7 parts of xylene and 7.2 parts of deodorized kerosene was treated in the same manner as in Example 12 to obtain an aerosol.

Example 17

A mixture comprising 0.3 part of the present compound (4), 0.2 part of the present compound (9), 2 parts of piperonyl butoxide, 11.5 parts of deodorized kerosene and 1 part of an emulsifier Atmos 300 (registered trademark of Atlas Chemical Co.) was emulsified by addition of 50 parts of pure water. Thereafter, the emulsified mixture was packed in an aerosol container together with 35 parts of a 3:1 mixture of deodorized butane and deodorized propane to obtain a water-based aerosol.

Example 18

A solution of 0.5 g. of each of the present compounds (2), (3), (5), (6), (10), (17), (18) and (20) in 20 ml. of methanol was uniformly stirred together with 99.5 g. of a mosquito coil carrier (a 3:5:1 mixture of Tabu powder, pyrethrum marc and wood flour). After vaporizing the methanol, the residue was thoroughly kneaded with 150 ml. of water, and then shaped and dried to obtain mosquito coils of the respective compounds.

Example 19

A solution of 0.3 g. of the present compound (1) and 0.3 g. of allethrin in 20 ml. of methanol was treated in the same manner as in Example 18 to obtain a mosquito coil.

Example 20

A solution of 0.2 g. of the present compound (5) and 0.1 g. of allethrin in a suitable amount of chloroform, and a solution of 0.2 g. of the present compound (14) and 0.2 g. of allethrin in chloroform were respectively applied to an asbestos piece of 2.5 cm. x 1.5 cm. in area and 0.3 mm. in thickness to obtain fibrous heating fumigant insecticidal compositions for use on a hot plate.

As the fibrous carrier, there may be used, in addition to the asbestos piece, a pulp sheet or the like material equivalent in effectiveness thereto.

Example 21

A mixture comprising 5 parts of each of the present compounds (7) and (14) and 5 parts of Toyolignin CT (registered trade name of Toyo Spinning Co.) was thoroughly stirred in a mortar together with 90 parts of GSM clay (registered trade name of Zieglite Mining Co.). The resulting mixture was kneaded with 10%, based on the amount of the mixture, of water and granulated by means of a granulator, followed by air-drying, to obtain granules of the respective compounds.

Example 22

To a solution of 1 part of each of the present compounds (1), (4), (5), (8), (10), (14), (16), (18) and (24) and 3 parts of piperonyl butoxide in 20 parts of acetone was added 96 parts of 300-mesh diatomaceous earth. The resulting mixture was thoroughly stirred in a mortar, and then the acetone was removed by vaporization to obtain dusts of the respective compounds.

Example 23

A mixture comprising 20 parts of each of the present compounds (1) and (14), 5 parts of 1-naphthyl-N-methylcarbamate and 5 parts of Sorpol SM–200 was thoroughly stirred in a mortar together with 70 parts of 300-mesh talc to obtain wettable powders of the respective compounds.

Example 24

A mixture comprising 0.1 part of each of the present compounds (14), (15), (16), (18), (19), (20) and (22) and 0.5 part of piperonyl butoxide was dissolved in deodorized kerosene to make the total amount 100 parts, whereby oil sprays of the respective compounds were obtained.

Example 25

0.1 Part of each of the present compounds (18), (19) and (20) was dissolved in deodorized kerosene to make the total amount 100 parts, whereby oil sprays of the respective compounds were obtained.

Example 26

A mixture comprising 0.3 part of the present compound (17), 0.1 part of Chrysron, 2 parts of piperonyl butoxide, 6 parts of xylene and 6.6 parts of deodorized kerosene was treated in the same manner as in Example 13 to obtain an aerosol.

Example 27

A mixture comprising 0.2 part of the present compound (21), 0.2 part of Chrysron, 7 parts of xylene and 7.6 parts of deodorized kerosene was treated in the same manner as in Example 13 to obtain an aerosol.

Example 28

A mixture comprising 0.4 part of the present compound (10), 0.5 part of Sumithion, 7 parts of xylene and 7.1 parts of deodorized kerosene was treated in the same manner as in Example 13 to obtain an aerosol.

Example 29

A mixture comprising 0.2 part of the present compound (21), 0.2 part of phthalthrin, 3.2 parts of piperonyl butoxide, 10.4 parts of deodorized kerosene and 1 part of an emulsifier Atmos 300 was emulsified by addition of 50 parts of pure water. Thereafter, the emulsified mixture was packed in an aerosol container together with 35 parts of a 3:1 mixture of deodorized butane and deodorized propane to obtain an water-based aerosol.

Example 30

A mixture comprising 5 parts of each of the present compounds (14), (16), (17), (18), (21) and (22), 15 parts of sufroxane and 10 parts of Sorpol SM–200 was thoroughly stirred together with 70 parts of xylene to obtain emulsifiable concentrates of the respective compounds.

Example 31

A solution of 0.3 g. of each of the present compounds (14), (15), (16), (20) and (21) and 0.2 g. of allethrin in 20 ml. of methanol was treated in the same manner as in Example 18 to obtain mosquito coils of the respective compounds.

Example 32

A solution of 0.3 g. of each of the present compounds (9), (11) and (21) and 0.2 g. of 5-propargylfurfuryl chrysanthemate in 20 ml. of methanol was treated in the same manner as in Example 18 to obtain mosquito coils of the respective compounds.

Insecticidal effects of the thus obtained compositions of the present invention are as set forth in the following examples:

Test Example 1

Into a (70 cm.)³ glass chambers were liberated about 50 adults of house flies. Subsequently, 0.7 ml. of each of the oil sprays containing the present compound (1), (2), (3), (4), (5), (6), (12) and (13), among the oil sprays obtained in Example 8 and Example 25, was sprayed thereto under a pressure of 20 lbs. by use of a glass atomizer. As the result, more than 80% of the flies could be knocked down within 10 minutes, and every oil spray could kill more than 70% thereof on the next day.

Test Example 2

According to the Campbell's turn table method (Soap and Sanitary Chemicals, Vol. 14, No. 6, page 119, 1938) 5 ml. of each of the oil sprays obtained in Examples 8, 9, 10 and 23 was sprayed, and a group of about 100 adults of house flies were exposed to the settling mist for 10 minutes. Thereafter, the flies were taken out, fed and allowed to stand for 1 day. As the result, every oil spray could kill more than 80% of the flies.

Test Example 3

The emulsifiable concentrate obtained in Example 11 was diluted with water to 20,000 times, and 2 liters of the resulting dilution was charged into a polystyrene case of 23 x 30 cm. in size and 6 cm. in depth. Subsequently, about 100 full-grown larvae of Northern house mosquitoes were liberated into the case. As the result, more than 90% of the mosquito larvae could be killed on the next day.

Test Example 4

Into a 14 liter polyethylene bucket containing 10 liters of water was charged 1 g. of the granule obtained in Example 21. After 1 day, about 100 full-grown larvae of Northern house mosquitoes were liberated into the water, and then the alive and dead thereof was observed. As the result, more than 90% of the mosquito larvae could be killed within 24 hours.

Test Example 5

Insecticidal effects on house fly adults of the aerosols obtained in Examples 12, 13, 14, 15, 16, 17, 26, 27, 28 and 29 were tested according to the aerosol test method using Peet Grady's chamber (6 ft.)³ (the method disclosed in Soap and Chemical Specialties, Blue Book, 1965). The results obtained were as set forth in the following table:

| Composition | Sprayed amount (g./1,000 ft.³) | Knock down ratio | | | Mortality (percent) |
|---|---|---|---|---|---|
| | | 5 min. | 10 min. | 15 min. | |
| Aerosol of Example 12 | 2.9 | 20 | 57 | 98 | 90 |
| Aerosol of Example 13 [containing the present compound (5)] | 3.0 | 24 | 59 | 88 | 72 |
| Aerosol of Example 13 [containing the present compound (14)] | 3.0 | 21 | 53 | 90 | 86 |
| Aerosol of example: | | | | | |
| 14 | 3.1 | 33 | 79 | 94 | 82 |
| 15 | 3.0 | 27 | 68 | 89 | 75 |
| 16 | 3.2 | 29 | 73 | 87 | 83 |
| Water-based aerosol of Example 17 | 3.1 | 34 | 82 | 93 | 86 |
| Aerosol of Example: | | | | | |
| 27 | 3.0 | 22 | 55 | 92 | 87 |
| 28 | 3.0 | 30 | 74 | 95 | 83 |
| 29 | 3.2 | 29 | 62 | 96 | 85 |

Test Example 6

Into a (70 cm.)³ glass chamber were liberated about 50 adults of Northern house mosquitoes, and a battery-driven small motor fan (13 cm. in blade diameter) was placed in the chamber and rotated. Subsequently, 0.5 g. of each of the mosquito coils obtained in Examples 18, 19, 31 and 32 was ignited on both ends and placed in the chamber. As the result, every mosquito coil could knock down more than 80% of the mosquitoes within 20 minutes.

Test Example 7

Into a (70 cm.)³ glass chamber were liberated about 50 adults of house flies, and a battery-driven small motor fan (13 cm. in blade diameter) was placed in the chamber and rotated. Subsequently, the heating fumigant composition obtained in Example 20 was placed on an electrically heated plate and fumigated in the chamber. As the result, more than 80% of the flies could be knocked down within 20 minutes.

Test Example 8

To the bottom of a glass Petri dish of 14 cm. in diameter, each of the dusts obtained in Example 22 was uniformly dusted in a proportion of 2 g./m.², and butter was coated on the lower part of the dish, leaving an uncoated portion of 1 cm. in width. Subsequently, a group of about 10 adults of German cockroaches were liberated in the dish and contacted with the dust for 30 minutes. As the result, every dust could knock down more than 80% of the cockroaches, and more than 70% of the knocked-down insects could be killed on the third day after the contact.

Test Example 9

100 Grams of unhulled rice grains were thoroughly stirred together with 200 mg. of each of the dusts obtained in Example 22. The resulting mixture was charged into a 100 ml. glass-made Erlenmeyer flask, and then about 50 rice weevils were liberated into the flask. Subsequently, the flask was covered, and the weevils were allowed to stand. As the result, more than 80% of the weevils could be killed within one week.

Test Example 10

Rice plants, which had elapsed 45 days after sowing, were grown in 1/50,000 Wagner pots. On the other hand, the emulsifiable concentrates containing the present compounds (1), (3), (7), (8) and (9) among the emulsifiable concentrates obtained in Examples 11 and 30 and the wettable powder obtained in Example 23, were individually diluted with water to 200 times. Subsequently, each of the resulting dilutions was sprayed to the rice plants in a proportion of 10 ml./pot. Thereafter, each pot was covered with a wire net, and about 30 adults of green rice leafhoppers were liberated into the wire net. As the result, more than 80% of the leafhoppers could be killed on the next day.

Test Example 11

Into a glass Petri dish of 14 cm. in diameter were liberated 10 tobacco cutworm larvae of the 3–4 instar stage. On the other hand, the emulsifiable concentrates containing the present compounds (1), (8) and (9), among the emulsifiable concentrates obtained in Example 11, were individually diluted with water to 150 times. Subsequently, 1 ml. of each of the resulting dilutions was sprayed to the larvae. Thereafter, the larvae were allowed to stand in the dish, into which baits had previously been charged. As the result, more than 90% of the larvae could be killed after 2 days.

Test Example 12

Cabbage seedlings, which had elapsed one month after sowing, were parasitized with a large number of aphides (*Muzus persica*) and placed on a turn table for spraying. On the other hand, the emulsifiable concentrates containing the present compounds (1) to (11) among the emulsifiable concentrates obtained in Example 11 were individually diluted with water to 150 times. Subsequently, each of the resulting dilutions was sprayed to the seedlings in a proportion of 3 ml. per seedling. As the result, more than 80% of the aphides could be killed after one day.

Test Example 13

The emulsifiable concentrates containing the present compounds (1), (4), (5), (6), (7), (8), (9) and (11), among the emulsifiable concentrates obtained in Example 11, were individually diluted with water to 200 and 600 times. In each of the resulting dilutions was immersed for 1 minute a tomato seedling, which had elapsed one month after sowing. After air-drying, the tomato seedling was placed in a covered plastic vessel capable of accommodating the seedling, and then lady beetles (*Epilachna viginti-octopunctata*) were liberated in the vessel. As the result, every 200 time-dilution could kill more than 80% of the beetles within 5 days. In the case of each of the 600 time-dilutions, more than one half of the beetles were still alive. Nevertheless, the seedling was scarcely attacked and was high in repellent effect as compared with the seedling in a non-sprayed area, and most of the survival insects could be killed after 8 days.

What is claimed is:

1. A compound of the formula

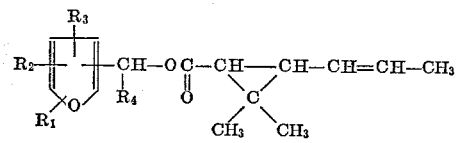

wherein propenyl group on the cyclopropane ring is cis or trans configuration regarding the double bond, and $R_1$ is a $C_1$–$C_3$ alkyl, allyl, propargyl, benzyl, thenyl, furylmethyl, phenoxy or lower alkyl-substituted benzyl, thenyl, furylmethyl or phenoxy, $R_2$ and $R_3$ are hydrogen or methyl respectively, or $R_1$ and $R_2$ are bonded at respective ends of the adjacent two groups to form a $C_3$–$C_4$ poylmethylene group, $R_4$ is hydrogen, lower alkyl, lower alkenyl or lower alkinyl.

2. A compound according to claim 1, wherein $R_4$ is lower alkinyl.

3. A compound of the formula,

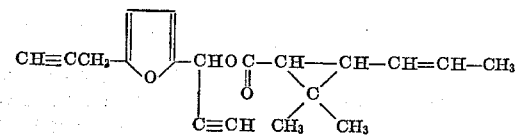

4. A compound of the formula,

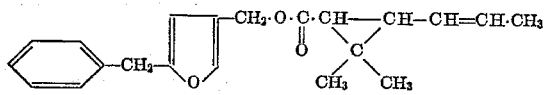

5. A compound of the formula,

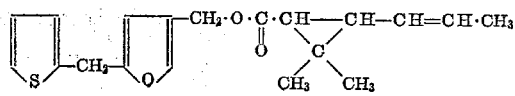

6. A compound of the formula,
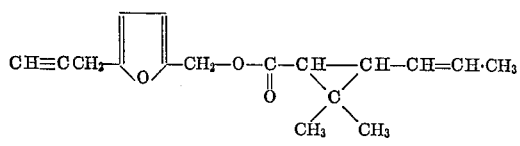
7. A compound of the formula,
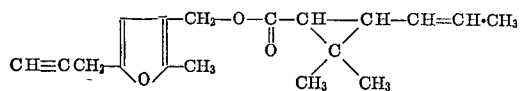
References Cited
UNITED STATES PATENTS
3,465,007  9/1969  Elliot _____ 260—347.4
HENRY R. JILES, Primary Examiner
B. DENTZ, Assistant Examiner
U.S. Cl. X.R.
260—326 A, 326.5 FM, 346.2 R, 347.4, 468 H; 424—274, 285, 305